(12) United States Patent
Chapple et al.

(10) Patent No.: US 6,734,862 B1
(45) Date of Patent: May 11, 2004

(54) MEMORY CONTROLLER HUB

(75) Inventors: James S. Chapple, Chandler, AZ (US); Tom E. Dever, Folsom, CA (US); Brian K. Langendorf, Benicie, CA (US); Cass A. Blodgett, Phoenix, AZ (US); Bryan R. White, Chandler, AZ (US); David M. Puffer, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 09/595,509

(22) Filed: Jun. 14, 2000

(51) Int. Cl.$^7$ .............................................. G06F 13/14
(52) U.S. Cl. ...................................... 345/520; 345/538
(58) Field of Search ................................ 345/543, 520, 345/502, 519, 562, 538, 537; 341/51; 710/309; 711/203

(56) References Cited

U.S. PATENT DOCUMENTS

| | | | |
|---|---|---|---|
| 5,793,996 A | | 8/1998 | Childers et al. ............ 395/309 |
| 5,941,968 A | * | 8/1999 | Mergard et al. ........... 710/308 |
| 6,069,638 A | | 5/2000 | Porterfield |
| 6,097,402 A | * | 8/2000 | Case et al. .................. 345/543 |
| 6,148,357 A | * | 11/2000 | Gulick et al. ............... 710/309 |
| 6,208,273 B1 | * | 3/2001 | Dye et al. ..................... 341/51 |
| 6,275,240 B1 | * | 8/2001 | Riffault ....................... 345/520 |
| 6,304,244 B1 | * | 10/2001 | Hawkins et al. ............ 345/502 |
| 6,374,317 B1 | | 4/2002 | Ajanovic et al. |
| 6,477,623 B2 | | 11/2002 | Jeddeloh |
| 6,480,200 B1 | | 11/2002 | Fisher et al. |
| 6,496,193 B1 | | 12/2002 | Surfi et al. |
| 6,532,019 B1 | * | 3/2003 | Gulick et al. ............... 345/519 |
| 6,593,932 B2 | * | 7/2003 | Porterfield .................. 345/568 |

FOREIGN PATENT DOCUMENTS

| | | |
|---|---|---|
| EP | 0 766 177 A1 | 4/1997 |
| EP | 0 902 355 A2 | 3/1999 |
| EP | 0326275 | 6/1999 |
| TW | 436694 | 5/2001 |
| WO | WO 99/28893 | 6/1999 |
| WO | WO 99/34293 | 7/1999 |
| WO | WO 00/29934 | 5/2000 |

OTHER PUBLICATIONS

VIA Technologies, Inc. Manual, *VIA ProSavage™ PM133*, http://www.via.com.tw/products/prodpm133.htm; Jan. 19, 2001.

VIA Technologies, Inc. Manual, *VIA ProSavage™ PM601*, http://www.via.com.tw/products/prodpm601.htm; Jan. 19, 2001.

VIA Technologies, Inc. Manual, *VIA APOLLO MVP4*, http://www.via.com.tw/products/prodpm601.htm; Jan. 19, 2001.

* cited by examiner

*Primary Examiner*—Matthew C. Bella
*Assistant Examiner*—Dalip K. Singh
(74) *Attorney, Agent, or Firm*—Fish & Richardson P.C.

(57) ABSTRACT

A memory controller hub has a data stream controller adapted to use a system memory to store graphics data and to control functions of the system memory, a processor interface, a system memory interface, a graphics subsystem coupled to the data stream controller and adapted to perform graphics operations on graphics data, and a graphics port adapted to couple the memory controller hub to an external graphics device.

48 Claims, 9 Drawing Sheets

| PIN # | AGP SIGNALS | LM SIGNALS | AGP SIGNALS | LM SIGNALS |
|---|---|---|---|---|
| 1 | OVRCNT# | | 12V | |
| 2 | 5.0V | | TYPEDET# | |
| 3 | 5.0V | | Reserved | |
| 4 | USB+ | | USB- | |
| 5 | GND | | GND | |
| 6 | INTB# | | INTA# | |
| 7 | CLK | | RST# | |
| 8 | REQ# | MD27 | GNT# | |
| 9 | VCC3.3 | | VCC3.3 | |
| 10 | ST0 | MD28 | ST1 | DQM3 |
| 11 | ST2 | MD29 | Reserved | |
| 12 | RBF# | MD30 | PIPE# | MD24 |
| 13 | GND | | GND | |
| 14 | Reserved | | WBF# | |
| 15 | SBA0 | MD31 | SBA1 | MD25 |
| 16 | VCC3.3 | | VCC3.3 | |
| 17 | SBA2 | DQM2 | SBA3 | MD26 |
| 18 | SB_STB | | SB_STB# | |
| 19 | GND | | GND | |
| 20 | SBA4 | MD23 | SBA5 | WE# |
| 21 | SBA6 | MD22 | SBA7 | FREQ_SEL |
| 22 | Reserved | | Reserved | |
| 23 | GND | | GND | |
| 24 | 3.3Vaux | | Reserved | |
| 25 | VCC3.3 | | VCC3.3 | |
| 26 | AD31 | MD21 | AD30 | TCLK0 |
| 27 | AD29 | MD20 | AD28 | TCLK1 |
| 28 | VCC3.3 | | VCC3.3 | |
| 29 | AD27 | MD19 | AD26 | CAS# |
| 30 | AD25 | MD18 | AD24 | |
| 31 | GND | | GND | |
| 32 | AD_STB1 | | AD_STB1# | |
| 33 | AD23 | MD17 | C/BE3# | RAS# |

FIG. 6a

| PIN # | AGP SIGNALS | LM SIGNALS | AGP SIGNALS | LM SIGNALS |
|---|---|---|---|---|
| 34 | Vddq | | Vddq | |
| 35 | AD21 | MD16 | AD22 | MA0 |
| 36 | AD19 | MD15 | AD20 | MA9 |
| 37 | GND | | GND | |
| 38 | AD17 | MD14 | AD18 | BA/MA11 |
| 39 | C/BE2# | MD13 | AD16 | MA8 |
| 40 | Vddq | | Vddq | |
| 41 | IRDY# | MD12 | FRAME# | MA10 |
| 42 | 3.3Vaux | | Reserved | |
| 43 | GND | | GND | |
| 44 | Reserved | | Reserved | |
| 45 | VCC3.3 | | VCC3.3 | |
| 46 | DEVSEL# | MD11 | TRDY# | MA7 |
| 47 | Vddq | | STOP# | CS# |
| 48 | PERR# | | PME# | |
| 49 | GND | | GND | |
| 50 | SERR# | | PAR | MA6 |
| 51 | C/BE1# | MD10 | AD15 | MA1 |
| 52 | Vddq | | Vddq | |
| 53 | AD14 | MD9 | AD13 | MA5 |
| 54 | AD12 | MD8 | AD11 | MA2 |
| 55 | GND | | GND | |
| 56 | AD10 | DQM1 | AD9 | MA4 |
| 57 | AD8 | MD0 | C/BE0# | MA3 |
| 58 | Vddq | | Vddq | |
| 59 | AD_STB0 | | AD_STB0# | |
| 60 | AD7 | MD1 | AD6 | MD5 |
| 61 | GND | | GND | |
| 62 | AD5 | MD2 | AD4 | MD6 |
| 63 | AD3 | MD3 | AD2 | MD7 |
| 64 | Vddq | | Vddq | |
| 65 | AD1 | MD4 | AD0 | DQM0 |
| 66 | Vrefcg | | Vrefgc | |

FIG. 6b

MEMORY CONTROLLER HUB

BACKGROUND

The invention relates to memory controller hubs.

Microcomputer systems generally include one or more memory controller hubs that control and coordinate the transfer of data between the computer's system memory, central processing unit (CPU), and peripheral devices. Graphics applications may be supported by peripheral devices known as graphics controllers that require a memory controller hub to transfer data between the devices, the system memory, and the CPU.

A design concern associated with microcomputer systems is the quality of two-dimensional (2D), three-dimensional (3D), and video image (often collectively referred to below as "graphics") processing. High-performance graphics processing requires processor-intensive calculations and the fast manipulation of large quantities of data. Several designs have been implemented to achieve high-performance graphics processing while also reducing the cost of the complete system and allowing for upgrades to the computer system's capability.

A computer system may include a graphics controller coupled to local memory for storing graphics data, so that the amount of data that must be transferred between the graphics controller and the system memory and/or the CPU is reduced. Increasing the amount of local memory available to the graphics controller improves graphics performance, but also increases the cost of the computer system, since local graphics memory is relatively expensive. Less local memory is required to achieve the same graphics performance, however, if a dedicated bus, e.g., an Accelerated Graphics Port (AGP), is used to couple the controller to the memory controller. An AGP allows the controller to treat portions of system memory as dedicated local graphics memory, which reduces the amount of local memory required and lowers overall system costs.

Computer system costs may also be reduced by eliminating the peripheral graphics controller and integrating its functionality into the memory controller hub. In such a configuration the memory controller hub is better described as a graphics/memory controller hub (GMCH), since it performs graphics processing functions in addition to memory control and transfer functions. Additionally, it includes one or more output ports to send graphics signals to external devices, such as cathode ray tubes (CRTs) and flat-panel monitors. Local graphics memory may then be eliminated.

BRIEF DESCRIPTION OF DRAWINGS

FIGS. 6a and 6b are a table of signals used to communicate across an AGP interface and across a local memory interface.

DETAILED DESCRIPTION

1. Overview

In some implementations of the invention, a memory controller hub is integrated with an internal graphics controller, and may interface with an external graphics device through an AGP. Because the memory controller hub controls both graphics and memory functions it is referred to as a graphics/memory controller hub (GMCH). The GMCH provides both internal graphics processing and scalable graphics performance through an AGP interface.

The GMCH may be used in one of two mutually exclusive modes: AGP mode, in which case the GMCH uses its capability to interface with an external graphics controller and its internal graphics functionality is disabled; or Gfx mode, in which case the GMCH uses its internal graphics capability, and its ability to interface with an external graphics controller is disabled. In Gfx mode the GMCH can still interface with a local memory module through the AGP to provide additional graphics memory for use by the internal graphics functionality. Whether the GMCH operates in AGP mode or Gfx mode can be automatically determined and set during the startup sequence of the computer.

Figure 1:
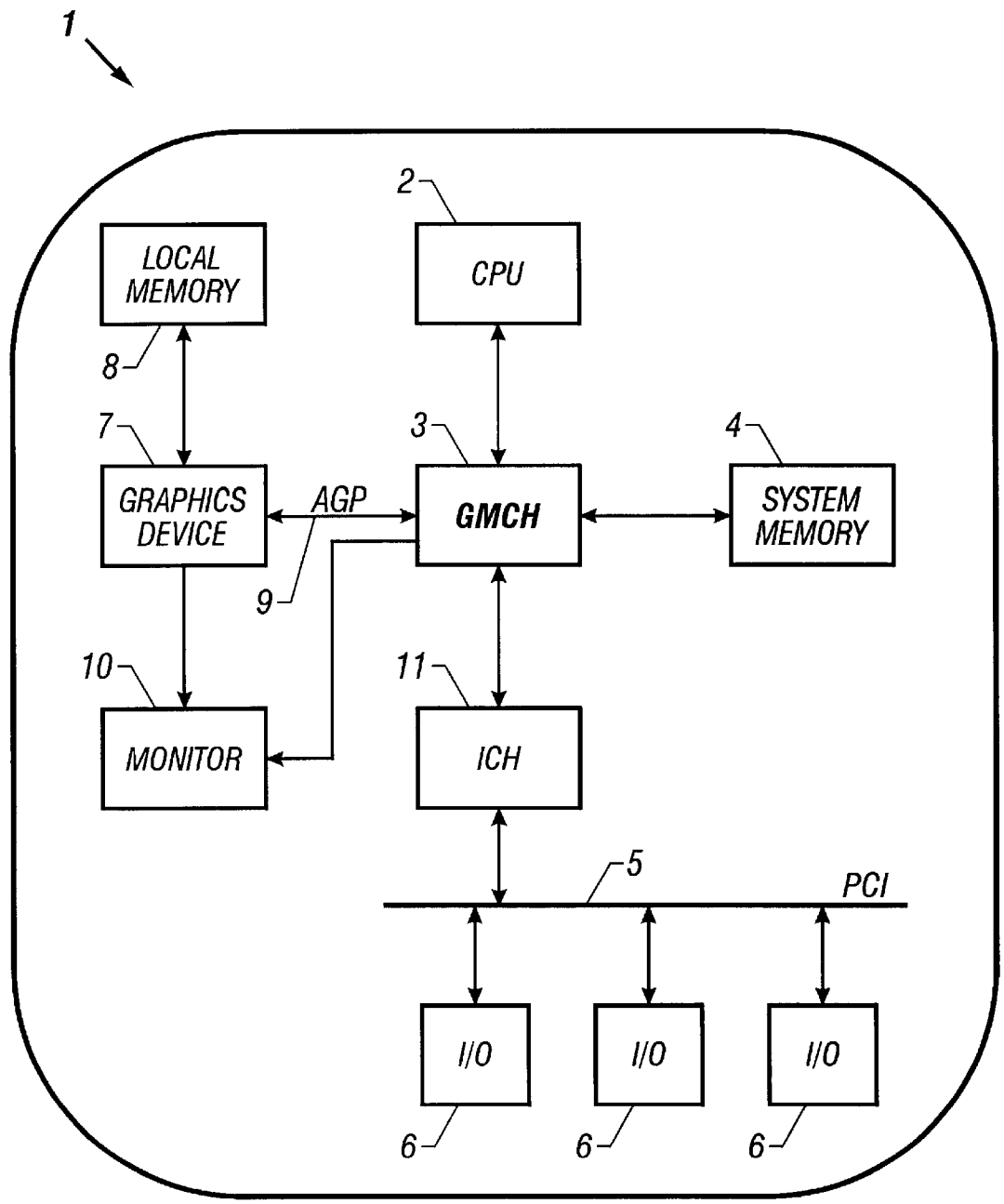
FIG. 1 is a schematic block diagram of a computer system.

FIG. 1 illustrates an exemplary computer system 1 in which the GMCH can be implemented. The computer system 1 includes a microprocessor (for example, a central processing unit, or "CPU") 2 coupled to a GMCH 3, which contains a system memory controller hub. GMCH 3 may also be referred to as a "chipset" or "core logic." GMCH 3 provides an interface between CPU 2 and system memory 4, and between CPU 2 and a bus, for example, a peripheral component interconnect (PCI) or Hublink™ bus 5. Various input/output (I/O) devices 6 are coupled to PCI bus 5 which is coupled to GMCH 3 via input/output controller hub (ICH) 11. Computer system 1 can also include a graphics device 7, which may be a graphics controller coupled to local memory 8, or which may be an AGP Inline Memory Module (AIMM) that provides external local memory for the internal graphics functionality of GMCH 3. A shared AGP/local memory interface 9 provides a dedicated interface bus between GMCH 3 and graphics device 7. Graphics and video signals may be sent to a display device 10 from graphics device 7 if one is present in the computer system, or may be sent to display device 10 from GMCH 3 if graphics device 7 is absent.

Figure 2:
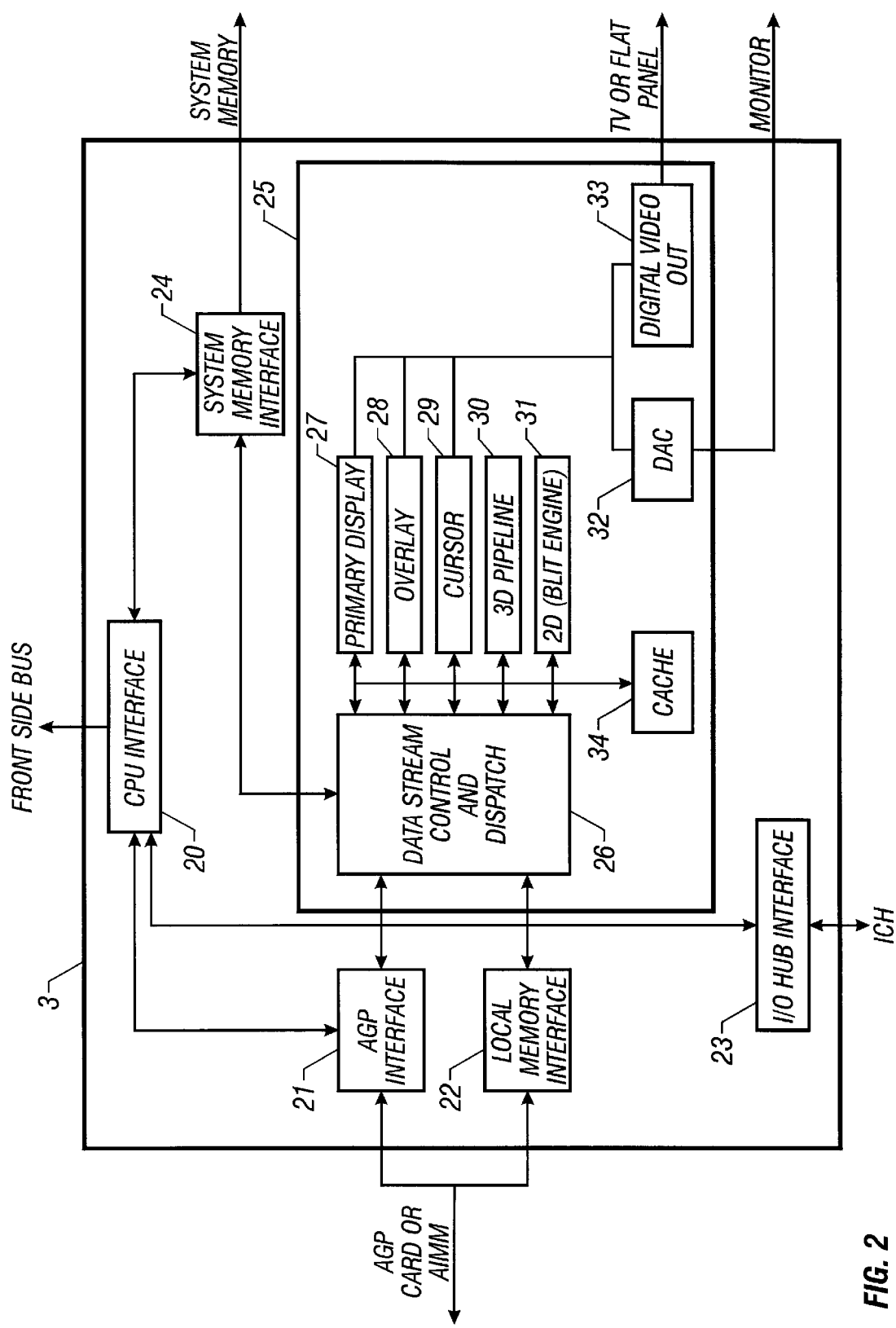
FIG. 2 is a schematic block diagram of a graphics memory controller hub.

FIG. 2 illustrates other details of GMCH 3 which includes a CPU interface 20 coupled to an AGP interface 21, a local memory interface 22, an input/output (I/O) hub interface 23, and a system memory interface 24. Graphics functions can be performed by internal graphics components 25 which include a data stream and dispatch controller 26 to manage the flow of data between system memory interface 24, CPU interface 20, I/O hub interface 23, AGP interface 21 and local memory interface 22.

The AGP interface 21 and local memory interface 22 enable GMCH 3 to be coupled, via a dedicated bus interface, to external graphics device 7. AGP interface 21 couples GMCH 3 to an external graphics controller (not shown) and local memory interface 22 couples GMCH 3 to an AIMM card (not shown) for use with internal graphics controller.

AGP interface 21 and local memory interface 22 share a physical interface, but communication protocols and signals across the interface depend on whether it is used to couple data stream and dispatch controller 26 to an AGP graphics adaptor or to an AIMM card.

2. AGP Interface

AGP interface 21 of GMCH 3 provides a dedicated bus to transfer data and memory access requests between graphics device 7 and system memory 4. The AGP bus provides sufficient bandwidth for a graphics controller in a computer system to run complex 3D graphics and full-motion video applications, for example, games and architectural and engineering simulations. The AGP is described in detail in the Accelerated Graphics Port Interface Specification, Revision 2.0, published by Intel Corporation, Santa Clara, Calif. (hereinafter the "AGP Specification"). PCI compliant devices, in addition to AGP compliant devices, may communicate across AGP interface 21.

Figure 3:
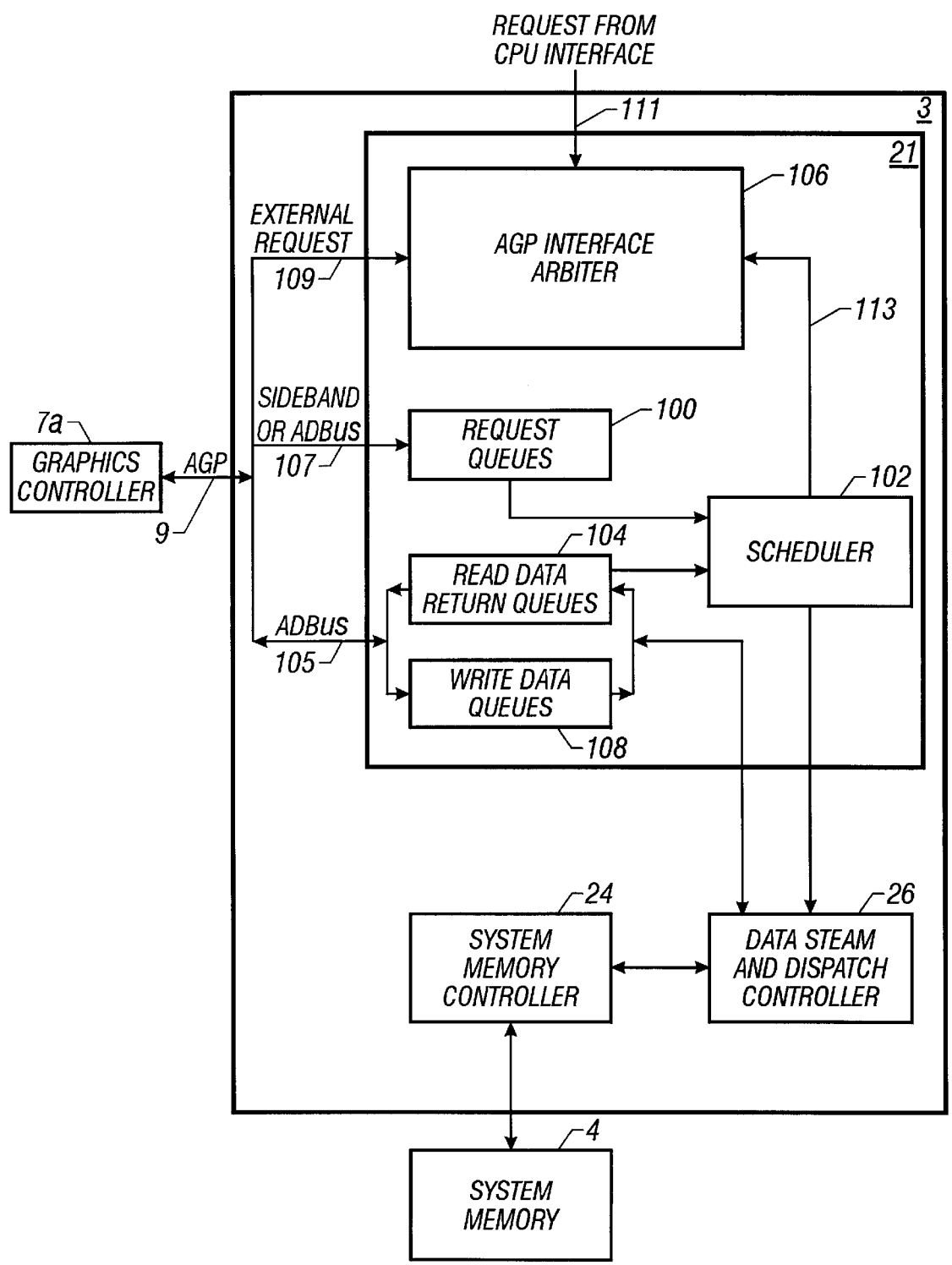
FIG. 3 is a schematic block diagram of an accelerated graphics port (AGP) interface of a graphics memory controller hub.

FIG. 3 is a schematic block diagram illustrating the AGP functionality of GMCH 3. AGP transactions are run in a split transaction fashion where the request for data transfer is disconnected in time from the data transfer itself. An AGP compliant graphics controller (bus master) 7a initiates a transaction with an access request. The AGP interface 21 responds to the request by directing the corresponding data transfer at a later time, which permits the AGP graphics controller 7a to pipeline several access requests while waiting for data transfers to occur. As a result of pipelining, several read and/or write access requests may be simultaneously outstanding in request queues 100. Access requests can either be pipelined across an address/data bus (AD bus) 105, 107 of AGP or transferred through sideband address lines 107 of AGP 9 and received by request queue 100.

Scheduler 102 processes the access requests in request queue 100. Read data are obtained from system memory 4 and are returned at the initiative of scheduler 102 via read data return queue 104 and across AD bus 105 of the AGP 9. Write data are provided by AGP compliant graphics controller 7a at the direction of scheduler 102 when space is available in the write data queue 108. Thus, AGP transactions generally include interleaved access requests and data transfers.

GMCH 3 uses a distributed arbitration model to integrate the functions of AGP compliant graphics controller 7a with other components connected to GMCH. Independent buses and interfaces (i.e., CPU interface 20, AGP interface 21, local memory interface 22, hub interface 23, and system memory interface 24) and distributed arbitration allow multiple transactions to be issued simultaneously. As long as transactions on the independently arbitrated buses do not compete for the common resources, they can proceed in parallel. The arbitration algorithms and policies fulfill particular agent requirements and may favor different aspects of system performance, for example, low bus/resource acquisition latency, optimized instantaneous peak bandwidth, or optimized sustained bandwidth.

AGP interface arbiter 106 detects external request signals 109, internal request signals 111 from CPU interface 20, and data queue status signals 113 from scheduler 102. Along with determining whether the AGP master 7a or GMCH 3 owns the physical interface, arbiter 106 dictates to the external graphics device 7a (the AGP master) the type of transactions that can be carried out during its ownership of the interface signals. The arbitration handshake and the function of AGP signals are described in detail in the AGP specification. Write data status inputs sent from scheduler 102 to arbiter 106 result from write access requests when space in write buffers 108 is available. Read data status inputs sent from scheduler 102 to arbiter 106 result from data being read from memory and made available in read queue 104 to be returned over AD bus 105.

Because the decisions of arbiter 106 depend on the state of the read buffers 104 and write buffers 108, the arbiter functions in conjunction with scheduler 102. Scheduler 102 dispatches AGP non-snoopable-requests internally to system memory interface 4 and identifies to AGP interface arbiter 106 the priority in which it should service pending requests and accept new requests. Scheduler 102 enforces compliance with AGP ordering rules and, along with system memory arbitration logic (not shown), allows high priority requests to be handled as highest priority events in the system.

3. Local Memory Interface

Figure 4:
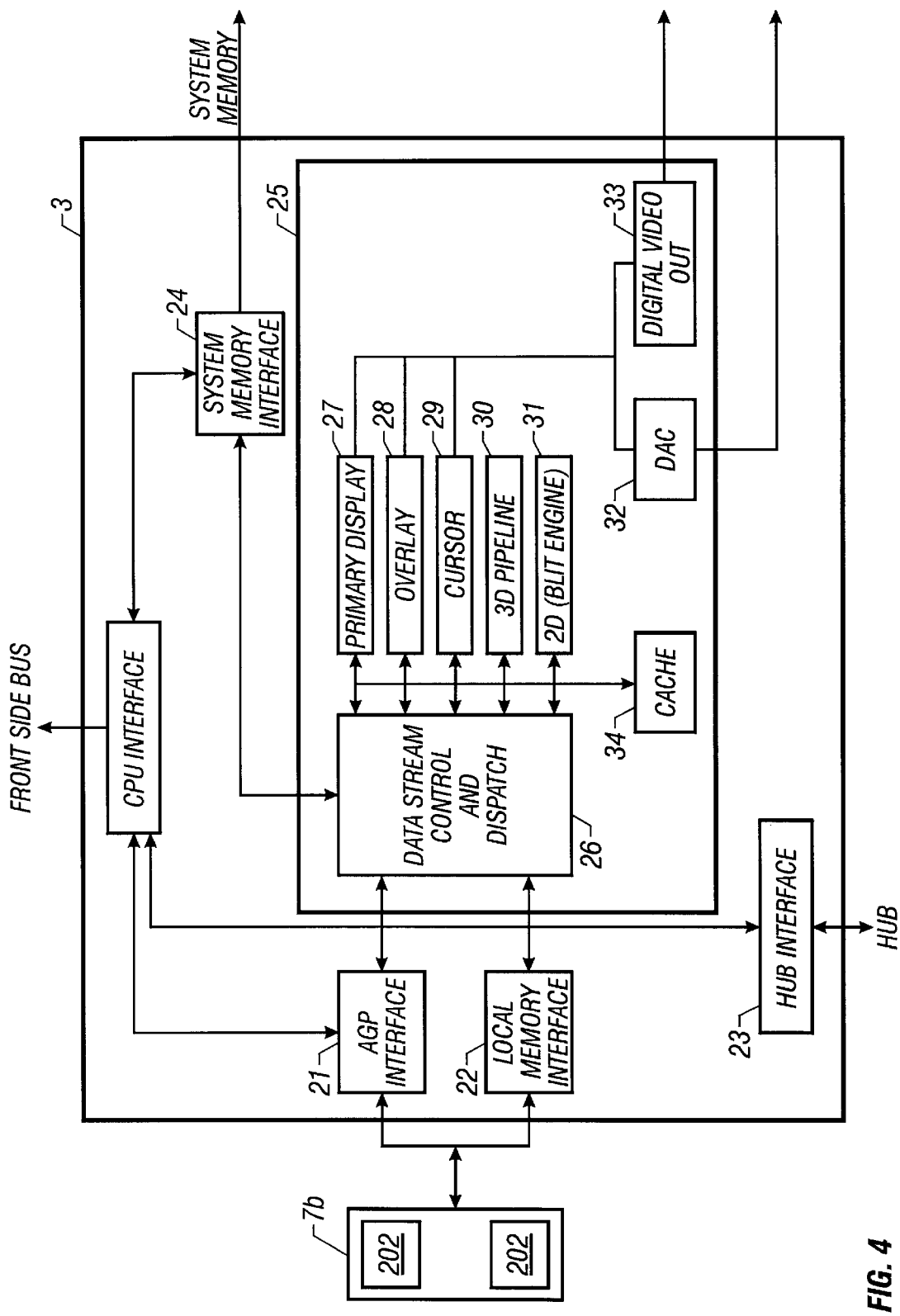
FIG. 4 is a schematic block diagram of a graphics memory controller hub coupled to an AGP inline memory module (AIMM).

Referring to FIG. 4, local memory interface 22 of GMCH 3 provides a dedicated 32-bit wide SDRAM channel to transfer graphics data between internal graphics components 25 of GMCH 3 and local graphics memory 202. Local memory interface 22 also manages the control and timing of such transfers. Local memory interface 22 is de-coupled from the internal graphics core 25 and can be enabled, for example, with frequencies of 100 megahertz (MHz) and 133 MHz, which may be independent of the graphics core.

As previously noted, AGP interface 21 and local memory interface 22 are physically shared, and the same component pins are used for both interfaces, although only one interface can be supported at any given time. The shared interface reduces the number of pins on GMCH 3 that would be required to support two independent interfaces and facilitates routing the design of the motherboard into which GMCH 3 and the card holding local graphics memory 202 are plugged in four layers. The reduces the GMCH cost and the board cost. As a result of the shared interface, almost all local memory interface signals can be mapped onto AGP interface 21. When GMCH 3 is configured in AGP mode, the shared interface supports the AGP interface 21. When GMCH 3 is configured in Gfx mode, the interface becomes a local memory interface 22, but local memory is optional and SDRAM devices need not be connected to interface 22.

Local memory can exist on an add-in AIMM card 7b that complies with the AGP form-factor. The user may populate the AGP slot in a GMCH system with an AGP Graphics card 7a, enabling the system in AGP mode to take advantage of graphics functionality on the AGP card, or with an AIMM card 7b to enable the highest possible internal graphics performance in Gfx mode. Alternately, the AGP slot can remain empty to obtain the lowest-cost Gfx mode solution. The AIMM card 7b plugs into a standard AGP connector on the motherboard of the computer system, but instead of providing AGP/PCI functionality, the card contains graphics memory, for example, one 2M×32 SDRAM device or two 1M×16 SDRAM devices 202.

Since the local memory interface supports both 100 MHz and 133 MHz frequencies, a strap can be used to determine which frequency to select. When AIMM card 7b is plugged into the AGP slot on the motherboard it communicates to GMCH 3 its appropriate operating frequency on one of the pins of local memory interface 22. GMCH 3 samples the pin during reset, but the value on this pin may also be overridden by software via the GMCH configuration register.

Since current SDRAM technology uses 3.3 volt (V) logic rather than the 1.5 V option supported by AGP, AIMM card 7b sets a signal on a pin of local memory interface 22 to indicate it requires 3.3 V power. Furthermore, the AIMM card should only present a 3.3 V key to local memory interface 22 and not a 1.5 V key, to prevent it from being inserted into a 1.5 V-only connector.

Figure 5:
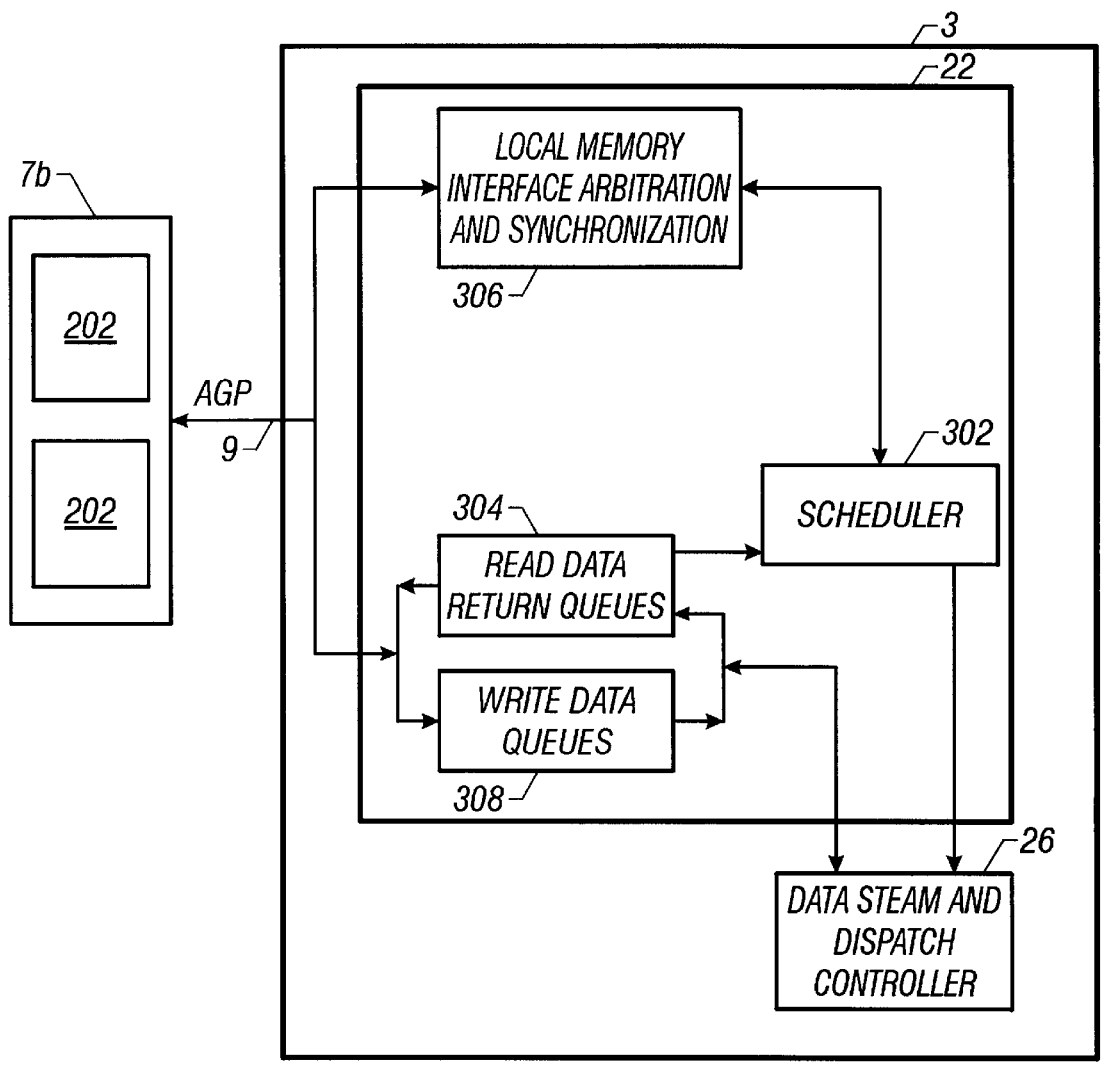
FIG. 5 is a schematic block diagram of a local memory interface of a graphics memory controller hub.

Referring to FIG. 5, the read queues 304 and write queues 308 in local memory interface 22 function similarly to the read/write queues for AGP interface 21. However, queues 304, 308 are modified slightly to handle additional local memory datapaths. Data are written from AIMM card 7b to read data queue 304, and to AIMM card 7b from write data queue 308 within local memory interface 22 over the AGP. Scheduler 302 and local memory arbiter 306 function together to control the flow of data across local memory interface 22.

In Gfx mode, the signal on the particular pin of AGP interface 21 which is used to indicate whether or not GMCH is operating in AGP mode should remain functional as a reference voltage for sampling 3.3V local memory data (LMD) inputs. The voltage level on the pin is identical to the level used in AGP mode.

4. AGP and Local Memory Signals

The pin mapping assignments can be made with the primary goal of optimizing the layout of the AIMM card. AGP signals as they exist on the standard AGP connector serve as a basis for the pin mapping, but special types of AGP signals such as strobes and any open-drain signals can be omitted. Also, some signals that exist on the standard AGP connector do not exist on GMCH's AGP interface, so these are not used for LM signals. The pin mapping assignments for AGP signals and LM signals are listed in the table shown in FIGS. 6A and 6B.

AGP addressing signals include PIPE# and SBA signals. PIPE# is a sustained tri-state signal from the master (i.e. the graphics controller) to GMCH 3, which triggers a pipeline read. PIPE# is asserted by the current master to indicate that a full width address is to be queued by the target. The master queues one request per rising clock edge while PIPE# is asserted. When PIPE# is deasserted no new requests are queued across the AD bus. SBA signals are sideband address signals sent across sideband bus 107 and are used to pass address and command signals from the AGP master to GMCH 3.

Pipeline reads and sideband addressing are two mutually exclusive mechanisms used to queue requests from the AGP master. When PIPE# is used to queue addresses, the master is not allowed to queue addresses using sideband bus 107. During configuration time, if the master indicates that it can use either mechanism, the configuration software will indicate which mechanism the master will use. The master will use the selected mechanism until it is reset and reprogrammed to use the other mode. A change of modes does not occur dynamically, but only when the device is first configured after being reset.

AGP flow control signals include RBF#, WBF#, and ST signals. RBF# (the read buffer full signal) indicates if the master is ready to accept previously requested low priority read data. RBF# is sampled only at the beginning of a cycle, and when it is asserted GMCH 3 is not allowed to return low priority read data to the AGP master on the first block. WBF# (the write buffer full signal) indicates if the master is ready to accept fast write data from GMCH 3. WBF# is sampled only at the beginning of a cycle, and when it is asserted, GMCH 3 is not allowed to drive fast write data to the AGP master. ST signals provide status information from arbiter 106 to the AGP master. ST signals can be used to indicate that previously requested low or high priority read data are being returned to the master, that the master is to provide low or high priority write data for a previously queue write command, or that the master has been given permission to start a bus transaction. ST signals are always an output from GMCH 3 and an input to the AGP master.

AGP frame# (PCI) signals, including FRAME#, IRDY#, TRDY#, STOP#, DEVSEL#, REQ#, GNT#, AD, C/BE, and PAR signals, are based on PCI signals defined in PCI Component Specification 2.1, but are redefined when used to carry out AGP transactions.

FRAME# is asserted by GMCH 3 during fast writes to indicate the beginning and duration of a data transfer transaction. REQ# is used to request access to the bus to initiate a PCI or AGP request. For fast write transactions, IRDY# is driven by GMCH 3 to indicate that the AGP master is ready to provide all write data for the current transaction. Once IRDY# is asserted for a write operations, the master is not allowed to insert wait states. The assertion of IRDY# for reads indicates that the master is ready to transfer write data. The master may insert wait states between transfers of 32 byte data blocks, but not during a transfer. GMCH 3 deasserts IRDY# to insert wait states between data blocks. TRDY# is used by the AGP master during fast write transactions to indicate if and when the AGP master is capable of transferring a subsequent block of read data. The target is allowed to insert wait states between 32 byte data block transfers if multiple blocks are to be sent. STOP# is used to indicate a signal disconnect or target abort termination. DEVSEL# is used to indicate that the transaction cannot complete during the block transfer. REQ# is input to AGP interface arbiter 106 to request access to the AGP bus in order to initiate an AGP or PCI transaction. GNT# is asserted if read data are pending in the read data return queue 104 or if a write command is received and space is available is the write data queue 108. GNT# is deasserted when there are no active inputs to AGP interface arbiter 106. AD signals are address and data signals sent across AD bus 105, 107 and are used to pass address and command signals from the AGP master to GMCH 3. C/BE (command/byte enable) signals provide command information when requests are being queued during pipelined transfers, and provide byte information during AGP write transactions. C/BE signals are not used during the return of read data. PAR is a parity signal used for PCI transactions, but not for AGP transactions, carried out over the AGP bus.

AGP clocking and miscellaneous signals include AD_STB, SB_STB, TYPEDET#, RST#, PME#, and USB signals. AD_STB (AD bus strobe) provides timing for 2x and 4x clocked data transferred as AD signals and C/BE signals on the AD bus 105. SB_STB (sideband strobe) provides timing for 2x and 4x clocked data transferred as SBA signals on SB bus 107. TYPEDET# is used to indicate what kind of logic signal shall be used with an AIMM card if one is plugged into the AGP interface. Since current SDRAM technology is always 3.3V rather than the 1.5V option also supported by AGP, the AIMM card should set the TYPEDET# signal correctly (open indicates 3.3 V; grounded indicates 1.5 V) to indicate it requires a 3.3V power supply (not grounded). Furthermore, the AIMM card should have only the 3.3V key and not the 1.5V key, preventing it from being inserted into 1.5V-only connector. RST# is received from ICH 11 and is used to reset AGP interface logic within the MCH. PME# (power management event) is used to wake up the device from a suspended state. USB signals are universal serial bus signals.

Local memory signals include MA, MD, DQM, CS#, RAS#, CAS#, WE#, FREQ_SEL, and TCLK. MA (memory address) signals provide the multiplexed row and column addresses from GMCH 3 to the local memory 200. MD (memory data) signals are used to interface with the local memory data bus. DQM signals control the memory array and act as synchronized output enables during read cycles and as byte enables during write cycles. CS# (chipset select) signal selects the local memory SDRAM components when asserted and indicates when a valid SDRAM command is present. RAS# and CAS# are row address strobe and column address strobe signals, respectively. WE# (write enable) signal is asserted during writes to local memory 200. FREQ_SEL indicates whether local memory 200 is to run at 100 MHz or 133 MHz. TCLK is the clock signal sent to local memory 200.

5. Internal Graphics Subsystem

Figure 7:
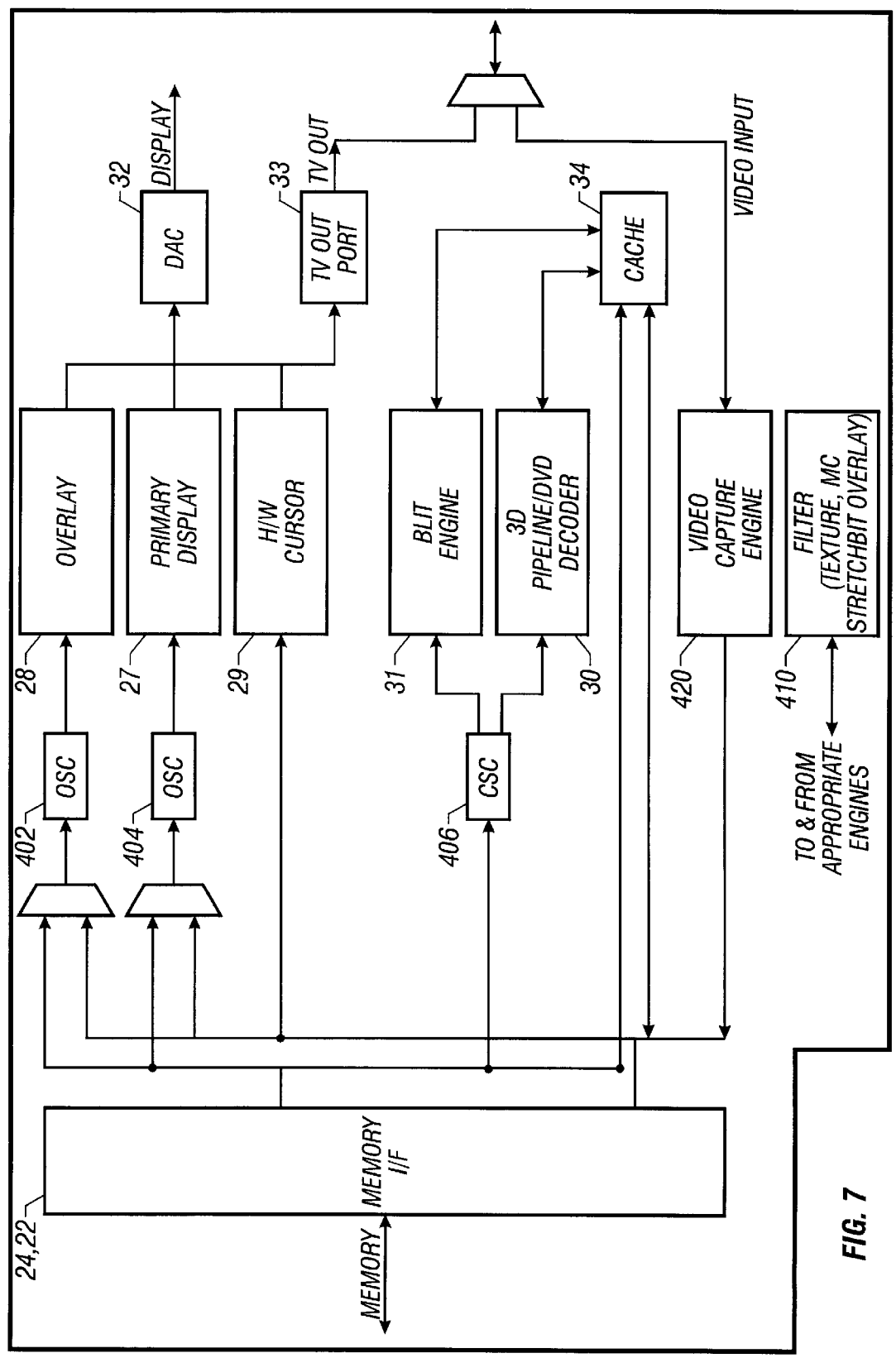
FIG. 7 is a schematic block diagram of internal graphics components of a graphics memory controller hub.

Referring to FIG. 7, further details of the internal graphics functionality 25 of GMCH 3 are shown. GMCH 3 and internal graphics 25 retrieve geometry, texture, and frame buffer data from CPU 2, system memory 4, and AIMM card 200, via memory interface 24 or local memory interface 22. Internal graphics functionality 25 also includes a cache 34 to avoid frequent memory fetches of recently used texture data.

Overlay stream controller (OSC) 402, display stream controller (DSC) 404, and command stream controller (CSC) 406 manage the requests and the flow of data to and from the agents that communicate with system memory interface 24. The stream controllers maintain request coherency, perform limited buffering of the data, and perform address translation to and from absolute memory addresses based on the format of the data.

A 3D pipeline subsystem 30 performs 3D rendering acceleration. Texture maps are loaded into system memory 24 and then read into 3D pipeline subsystem 30 via system memory interface 24 and data stream and dispatch controller 26. 3D pipeline subsystem 30 then converts per-vertex data into gradients that can be used to interpolate the data at any pixel within a polygon, for example, colors, alpha, z-depth, fog, texture coordinates, and the like. The pixels covered by a polygon are identified by 3D pipeline subsystem 30, which then calculates per-pixel texture addresses.

A blit engine 31 provides hardware acceleration for block transfers of data (Blitting). Blitter engine 31 provides the ability to copy a source block of data from system memory 4 and perform operations (e.g., raster operations) on the data locally within internal graphics 25. Blit engine 31 speeds the display of moving objects on a display device, for example, animation, scrolling, and moving windows in a graphical user interface (GUI). For example, text scrolls faster when it is copied as a contiguous block by blit engine 31 to the next part of the display window rather than processing every character on every line.

A filter block 410 is shared between several functional engines, for example, motion compensation, texture filtering, overlay and stretchblt engines. Stretchblt engine is used to move source data to a destination that need not be the same size, with source transparency.

The video output subsection of GMCH 3 includes primary display engine 27, overlay engine 28, and cursor engine 29, which all feed into a display digital-to-analog converter (DAC) 32. DAC 32 provides the analog output to the display device The video syncs and timing are programmable and are generated internally to GMCH 3. Overlay engine 28 provides the capability to combine a full motion video stream with the frame buffer data. The motion video data can be scaled both horizontally and vertically prior to being combined with the frame buffer data. The display cursor is also integrated with the display stream in this subsection. The video display section supports display resolutions from 320×200 up to 1600×1200 pixels and can perform Gamma Correction oh the video data. Graphics data can also be output through a digital video output port 33 and then processed to drive a flat-panel or television display device.

The video capture subsection 420 of the graphics functionality 25 provides for video capture of digital video. The capture engine can capture YUV format data. It puts these data in the local memory, and the video display controller can use these data directly for its overlay output, or an application can receive a pointer to these data for the purpose of generating a texture map from it.

6. Choosing Between AGP Mode and Gfx Mode at Startup

Figure 8:
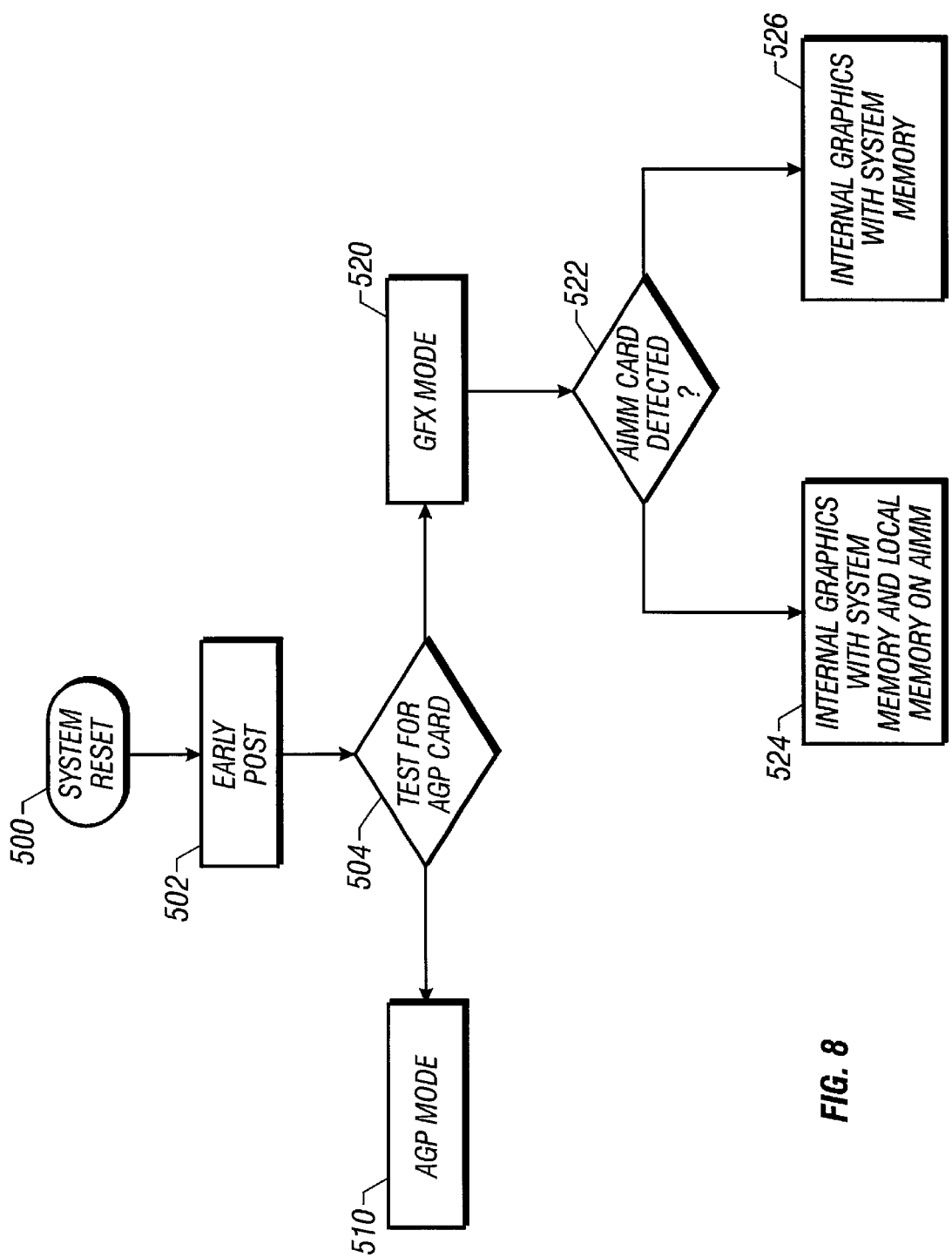
FIG. 8 is a flow chart of a method of selecting either AGP mode or Graphics mode for use by a graphics memory controller hub.

Referring to FIG. 8, when the computer system is reset, it automatically detects whether an external graphics controller or an AIMM card is plugged into shared AGP/local memory interface and initializes the computer in the appropriate graphics mode.

The computer system 1 can be reset 500 when it is powered up, reset by the user, or automatically reset by the computer system. During early Power On Self Test (POST) 502 the system basic input output system (BIOS) performs various tests of the computer system hardware and software including detecting system memory and basic initialization of hardware and software. During the POST, the BIOS tests if an AGP graphics controller is plugged into the AGP slot 504 by executing a configuration read to the PCI bus.

If an AGP compatible controller is present, it is detected by the system BIOS and serves as the graphics controller for the computer system. The computer system is initialized in AGP mode 510, and an AGP/Gfx select bit is set to 0 in a configuration register to track this fact for the system. No further initialization of internal graphics need take place.

If an AGP compatible controller is not located, the computer system is initialized to operate in Gfx mode 520 to use internal graphics, and AGP/Gfx select bit is set to 1. After Gfx mode is selected, the BIOS tests 522 for the presence of an AIMM card. If an AIMM card is not present, the computer system is initialized to use internal graphics functionality with system memory 526. If an AIMM card is detected, then the operating frequency (100 MHz or 133 MHz) of the local memory interface is determined by sampling a signal on a pin of local memory interface. Memory timing options, such as such as column address strobe latency and row address strobe pre-charge cycles, are then determined empirically by the system BIOS. The BIOS starts by programming slow timings, then functionally tests memory. The BIOS then attempts to set increasingly faster timings until a data mismatch occurs during functional testing of memory. The settings that optimize performance without compromising functionality are selected.

Other implementations are within the scope of the claims.

What is claimed is:

1. A memory controller hub comprising:
 a data stream controller adapted to use a system memory to store graphics data and to control functions of the system memory;
 a processor interface;
 a system memory interface;

a graphics subsystem coupled to the data stream controller and adapted to perform graphics operations on graphics data; and a dedicated graphics port adapted to couple the memory controller hub to an external graphics device, wherein the dedicated graphics port is operative to transfer graphics data between the external graphics device and the system memory interface in a first mode, and to transfer graphics data between the graphics subsystem and a local memory coupled to the external graphics device in a second mode.

2. The memory controller hub of claim 1 further comprising a video output port coupled to the graphics subsystem and adapted to output video signals from the memory controller hub.

3. The memory controller hub of claim 2 wherein the video output port is adapted to provide video signals directly to a display device.

4. The memory controller hub of claim 2 wherein the video output port comprises an analog video output port.

5. The memory controller hub of claim 2 wherein the video output port comprises a digital video output port.

6. The memory controller hub of claim 2 wherein the video output port comprises an analog video output port and a digital video output port.

7. The memory controller hub of claim 1 wherein the graphics port is adapted to couple the memory controller hub to the external graphics device though a dedicated bus interface.

8. The memory controller hub of claim 7 wherein the dedicated bus interface includes an accelerated graphics port (AGP).

9. The memory controller hub of claim 7 wherein the external graphics device includes an AGP inline memory module.

10. The memory controller hub of claim 7 wherein the external graphics device includes a graphics controller.

11. The memory controller hub of claim 10 wherein the graphics port is adapted to transfer graphics data between the system memory and the graphics controller through the data stream controller and through the dedicated bus interface.

12. The memory controller hub of claim 10 wherein the graphics controller is adapted to provide video signals to the display device.

13. The memory controller hub of claim 1, further including a test module operative to determine if a external graphics device present and to set the dedicated graphics port in the first mode or the second mode in response to said test.

14. A computer system comprising:

a CPU;

a display device;

a system memory, the system memory adapted to store video data and non-video data; and a memory controller hub coupled to the CPU and coupled to the system memory, the memory controller hub being adapted to perform memory control and graphics functions, the memory controller hub comprising:

a video output port to provide video signals to the display device; and a dedicated graphics port to couple the memory controller hub to an external graphics device, wherein the dedicated graphics port is operative to transfer graphics data between the external graphics device and the system memory interface in a first mode, and to transfer graphics data between the graphics subsystem and a local memory coupled to the external graphics device in a second mode.

15. The computer system of claim 14 wherein the video output port is adapted to provide video signals directly to the display device.

16. The computer system of claim 14 wherein the video output port comprises an analog output port.

17. The computer system of claim 14 wherein the video output port comprises a digital output port.

18. The computer system of claim 14 wherein the video output port comprises an analog output port and a digital output port.

19. The computer system of claim 14 further comprising a dedicated bus interface coupled to the graphics port to couple the memory controller hub to the external graphics device.

20. The computer system of claim 14, further including a test module operative to determine if a external graphics device present and to set the dedicated graphics port in the first mode or the second mode in response to said test.

21. The computer system of claim 14 further comprising an engine to determine if the graphics port is coupled to an external graphics device.

22. The computer system of claim 21 wherein the engine is adapted for generating a signal to activate an external graphics device to control the processing of graphics data if an external graphics device is coupled to the graphics port at boot-up time, and the engine is adapted for generating a signal to activate the memory controller hub to control the processing of graphics data if an external graphics device is not coupled to the graphics port at boot-up time.

23. The computer system of claim 19 wherein the dedicated bus interface includes an accelerated graphics port (AGP).

24. The computer system of claim 19 wherein the external graphics device includes an AGP inline memory module.

25. The computer system of claim 19 wherein the external graphics device includes a graphics coprocessor.

26. The computer system of claim 24 wherein the graphics port is adapted to transfer graphics data between the system memory and the graphics coprocessor via the memory controller hub and through the dedicated bus interface.

27. The computer system of claim 24 wherein the graphics coprocessor is adapted to provide video signals to the display device.

28. A memory controller hub comprising:

a data stream controller adapted to use a system memory to store graphics data and to control functions of the system memory;

a processor interface;

a system memory interface;

a graphics subsystem coupled to the data stream controller and adapted to perform graphics operations on graphics data; and a dedicated graphics port adapted to couple the memory controller hub to an external graphics device, wherein the graphics port is adapted to couple the memory controller hub to the external graphics device though a dedicated bus interface, wherein the external graphics device includes an AGP inline memory module, and wherein the graphics port is adapted to transfer graphics data between the system memory and the AGP inline memory module through the data stream controller and through the dedicated bus interface.

29. The memory controller hub of claim 28, further comprising a video output port coupled to the graphics subsystem and adapted to output video signals from the memory controller hub.

30. The memory controller hub of claim 29 wherein the video output port is adapted to provide video signals directly to a display device.

31. The memory controller hub of claim 29 wherein the video output port comprises an analog video output port.

32. The memory controller hub of claim 29 wherein the video output port comprises a digital video output port.

33. The memory controller hub of claim 29 wherein the video output port comprises an analog video output port and a digital video output port.

34. The memory controller hub of claim 10 wherein the dedicated bus interface includes an accelerated graphics port (AGP).

35. The memory controller hub of claim 10 wherein the external graphics device includes a graphics controller.

36. The memory controller hub of claim 35 wherein the graphics port is adapted to transfer graphics data between the system memory and the graphics controller through the data stream controller and through the dedicated bus interface.

37. The memory controller hub of claim 35 wherein the graphics controller is adapted to provide video signals to the display device.

38. A computer system comprising:
a CPU;
a display device;
a system memory, the system memory adapted to store video data and non-video data; and
a memory controller hub coupled to the CPU and coupled to the system memory, the memory controller hub being adapted to perform memory control and graphics functions, the memory controller hub comprising:
a video output port to provide video signals to the display device;
a dedicated graphics port to couple the memory controller hub to an external graphics device; and
a dedicated bus interface coupled to the graphics port to couple the memory controller hub to the external graphics device,
wherein the external graphics device includes an AGP inline memory module, and
wherein the graphics port is adapted to transfer graphics data between the system memory and the AGP inline memory module via the memory controller hub and through the dedicated bus interface.

39. The computer system of claim 38 wherein the video output port is adapted to provide video signals directly to the display device.

40. The computer system of claim 38 wherein the video output port comprises an analog output port.

41. The computer system of claim 38 wherein the video output port comprises a digital output port.

42. The computer system of claim 38 wherein the video output port comprises an analog output port and a digital output port.

43. The computer system of claim 38 wherein the dedicated bus interface includes an accelerated graphics port (AGP).

44. The computer system of claim 38 wherein the external graphics device includes a graphics coprocessor.

45. The computer system of claim 38 wherein the graphics port is adapted to transfer graphics data between the system memory and the graphics coprocessor via the memory controller hub and through the dedicated bus interface.

46. The computer system of claim 38 wherein the graphics coprocessor is adapted to provide video signals to the display device.

47. The computer system of claim 38 further comprising an engine to determine if the graphics port is coupled to an external graphics device.

48. The computer system of claim 47 wherein the engine is adapted for generating a signal to activate an external graphics device to control the processing of graphics data if an external graphics device is coupled to the graphics port at boot-up time, and the engine is adapted for generating a signal to activate the memory controller hub to control the processing of graphics data if an external graphics device is not coupled to the graphics port at boot-up time.

* * * * *